US010070192B2

(12) United States Patent
Baratz

(10) Patent No.: US 10,070,192 B2
(45) Date of Patent: Sep. 4, 2018

(54) APPLICATION FOR DETERMINING AND RESPONDING TO USER SENTIMENTS DURING VIEWED MEDIA CONTENT

(71) Applicant: Disney Enterprises, Inc., Burbank, CA (US)

(72) Inventor: Maya Baratz, New York, NY (US)

(73) Assignee: Disney Enterprises, Inc., Burbank, CA (US)

(*) Notice: Subject to any disclaimer, the term of this patent is extended or adjusted under 35 U.S.C. 154(b) by 239 days.

(21) Appl. No.: 13/836,909

(22) Filed: Mar. 15, 2013

(65) Prior Publication Data
US 2014/0282651 A1 Sep. 18, 2014

(51) Int. Cl.
H04N 7/16 (2011.01)
H04H 60/33 (2008.01)
H04N 21/4788 (2011.01)
H04N 21/222 (2011.01)

(52) U.S. Cl.
CPC ....... H04N 21/4788 (2013.01); H04N 21/222 (2013.01)

(58) Field of Classification Search
CPC .... G06Q 10/105; G06Q 50/01; H04L 12/588; H04H 60/80; H04H 60/33; H04H 60/65; H04N 21/4756; H04N 21/4788; H04N 7/18; G06K 9/00308; G06K 9/00315; G06K 9/00261
USPC ..... 725/9–11, 13, 16, 24; 348/156, E07.085; 709/203, 242
See application file for complete search history.

(56) References Cited

U.S. PATENT DOCUMENTS

| 9,038,054 B1* | 5/2015 | Kozak | G06Q 30/02 717/170 |
| 2002/0144273 A1* | 10/2002 | Reto | H04L 29/06027 725/86 |
| 2005/0278764 A1* | 12/2005 | Barr | G11B 27/036 725/100 |
| 2007/0094686 A1* | 4/2007 | Kim | G11B 27/105 725/45 |
| 2008/0092168 A1* | 4/2008 | Logan et al. | 725/44 |
| 2009/0133071 A1* | 5/2009 | Sakai | H04N 5/4403 725/46 |
| 2009/0293079 A1* | 11/2009 | McKee | G06Q 10/105 725/10 |

(Continued)

Primary Examiner — Brian T Pendleton
Assistant Examiner — Alan Luong
(74) Attorney, Agent, or Firm — Farjami & Farjami LLP

(57) ABSTRACT

There is provided a system and method for a platform for determining and responding to user sentiments during viewed media content. The method comprises displaying on a display, a plurality of user selectable sentiment actions to a plurality of users during broadcast of a media content, receiving a first selection of at least one of the plurality of user selectable sentiment actions from each of the plurality of users, and determining a first threshold sentiment level based on the first selection of the at least one of the plurality of user selectable sentiment actions. The method may further comprise sharing the first selection of the at least one of the plurality of user selectable sentiment actions from each of the plurality of users using a social media platform. Additionally, the method may also further comprise triggering a sentiment soundtrack corresponding to the first threshold sentiment level.

16 Claims, 4 Drawing Sheets

(56) References Cited

U.S. PATENT DOCUMENTS

| | | | |
|---|---|---|---|
| 2011/0219394 A1* | 9/2011 | Lueth | H04N 7/025 |
| | | | 725/24 |
| 2012/0072451 A1* | 3/2012 | Merrifield | A63F 13/35 |
| | | | 3/35 |
| 2012/0206603 A1* | 8/2012 | Rekimto | G06K 9/00308 |
| | | | 348/156 |
| 2012/0311032 A1* | 12/2012 | Murphy | G07F 17/3225 |
| | | | 709/204 |
| 2013/0144937 A1* | 6/2013 | Lee | G06Q 50/01 |
| | | | 709/203 |
| 2014/0089815 A1* | 3/2014 | Gildfind et al. | 715/753 |

* cited by examiner

APPLICATION FOR DETERMINING AND RESPONDING TO USER SENTIMENTS DURING VIEWED MEDIA CONTENT

BACKGROUND

As technology continues to evolve, audiences are given an increasingly wide variety of platforms to watch media content. For example, audiences may view media content within web browsers, through mobile telephones and interactive devices, or more conventionally using televisions receiving media content from broadcast stations. Thus, audience members are given the opportunity to consume live and prerecorded media content in environments that are the most convenient to the audience members. However, because of the flexibility in choosing the location the audience members wish to view the media content, often this means that audience members watch the media content in private or small groups. This lessens the audience member's engagement with the media content and other audience members.

Thus, people increasingly use social media platforms to as a means to overcome this lack of audience engagement. Social media platforms allow a user to post messages and share thoughts about media content the audience member is viewing. However, messages are not intuitively or necessarily immediately expressed due to the present means of expressing responses. Additionally, the messages may be limited, such as by friend lists or social groups. Thus, although the audience member is able to share their feelings and interests in some social media content, they do not feel the same immersive participation as they would in a real an audience.

SUMMARY

The present disclosure is directed to an application for determining and responding to user sentiments during viewed media content, substantially as shown in and/or described in connection with at least one of the figures, as set forth more completely in the claims.

DETAILED DESCRIPTION

Figure 1:
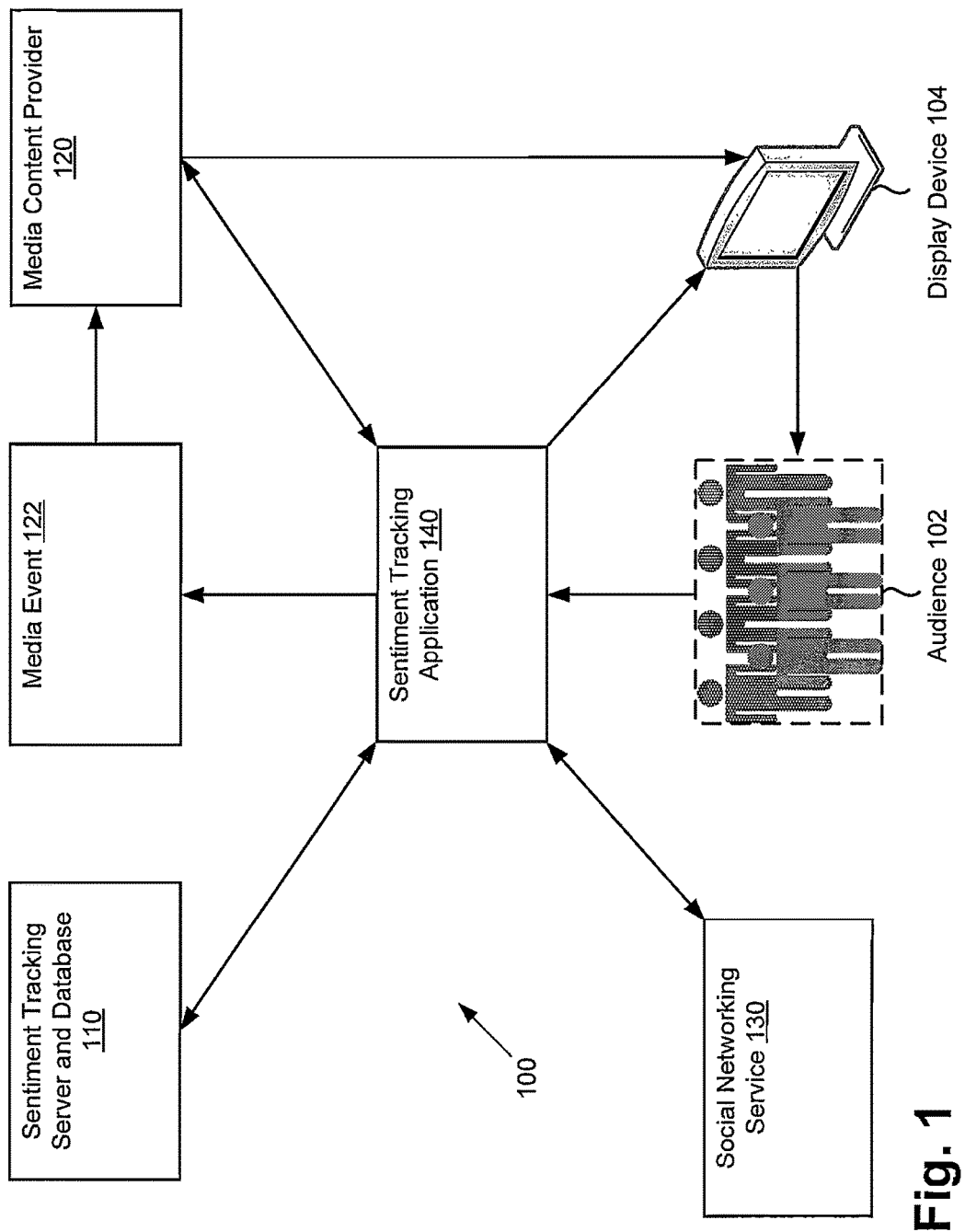
FIG. 1 presents an exemplary diagram of a system environment for providing an application for determining and responding to user sentiment during viewed media content.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents an exemplary diagram of a system environment for providing an application for determining and responding to user sentiment during viewed media content. System environment 100 of FIG. 1 shows audience 102 viewing display device 104. Display device 104 receives media content from media content provider 120 either directly or through sentiment tracking application 140. The media content may correspond to media event 122 transmitted to media content provider 120. During broadcast of the media content, audience 102 may interact with sentiment tracking application 140. Sentiment tracking application 140 provides data back to display device 104 for output to audience 102, and/or provides data to sentiment tracking server and database 110, media content provider 120, media event 122, and/or social networking service 130.

According to the implementation of FIG. 1, media content provider 120 may provide media content corresponding to media event 122, such as a linear program stream or channel, for example. Media content provider 120 may be a media content provider such as a television or radio network, providing media content, such as an audio-visual, video, or audio stream, for example. Thus, media event 122 may correspond to live media content, such as a live media broadcast, such as a sporting event, debate, news program, live interrupt, a prerecorded media content, such as a television program, movie, or other media content. More generally, as more media content becomes available, media content provider 120 may be any producer of media content, such as a user generated content provider or new source provider, for example. Therefore, and as shown in FIG. 1, media content provider 120 may provide media event 122 to display device 102 directly, via cable or satellite television, or radio airwaves, for example, or may otherwise provide content to display 102, such as through a network. The network may correspond to a network connection, such as a wireless phone service communication network, broadband network, or other network capable of sending of receiving data.

A plurality of users may make up audience 104, who may consume media event 122 provided by media content provider 120 through display device 102. For example, audience 104 may view a television program provided by media content provider 120 through a television. Although in the implementation of FIG. 1, display device 102 is shown as a screen display, display device 102 may be any suitable means for outputting the media content, such as a television, a radio, a computer display, a mobile telephone, or a gaming console, for example.

Prior to or during the course of viewing media event 122, audience 102 may access sentiment tracking application 140. Sentiment tracking server and database 110 may transmit sentiment tracking application to a user device, display device 104, and/or media content provider 120 for use by audience 102. Sentiment tracking server and database 110 may correspond to a dedicated networked server. As will be discussed in more detail in reference to FIGS. 2 and 3, sentiment tracking server and database 110 may provide an application that allows user sentiment to be tracked while viewing media event 122. As previously discussed, sentiment tracking server and database 110 may provide the application directly to media content provider 120 for transmission with the media content. In alternative implementations, sentiment tracking server and database 110 may provide the application to display device 104 or a separate user device.

As audience 102 views media event 122 provided by the media content stream from media content provider 120 on display device 104, audience 102 may interact with sentiment tracking application 140 as will be discussed in further detail with respect to FIGS. 2 and 3. In certain implementations, media event 122 may be shown concurrently with sentiment tracking application 140 on display device 104. However, in other implementations, display device 104 may display media event 122 and audience may utilize sentiment tracking application 140 as a separate application on display device 104, or may utilize a separate user device having sentiment tracking application 140.

Additionally shown in FIG. 1 is social networking service 130. Social networking service 130 may correspond to a dedicated server that may provide social media, social networking services, or other social sharing services, such as microblogging. Thus, social networking service 130 may correspond to any of a variety of social networking services, such as Twitter™, Facebook™, or Google+™, for example. Sentiment tracking application 140 is shown in contact with social networking service 130 and may provide inputs from audience 102, such as sentiments tracked during viewing of a media event 122 as will be discussed in further detail below.

Although in the implementation of FIG. 1, sentiment tracking server and database 110, media content provider 120, and social networking service 130, are shown to exist as distinct networked entities, it is understood that two or more of sentiment tracking server and database 110, media content provider 120, and social networking service 130 may be included in a single network entity.

Figure 2:
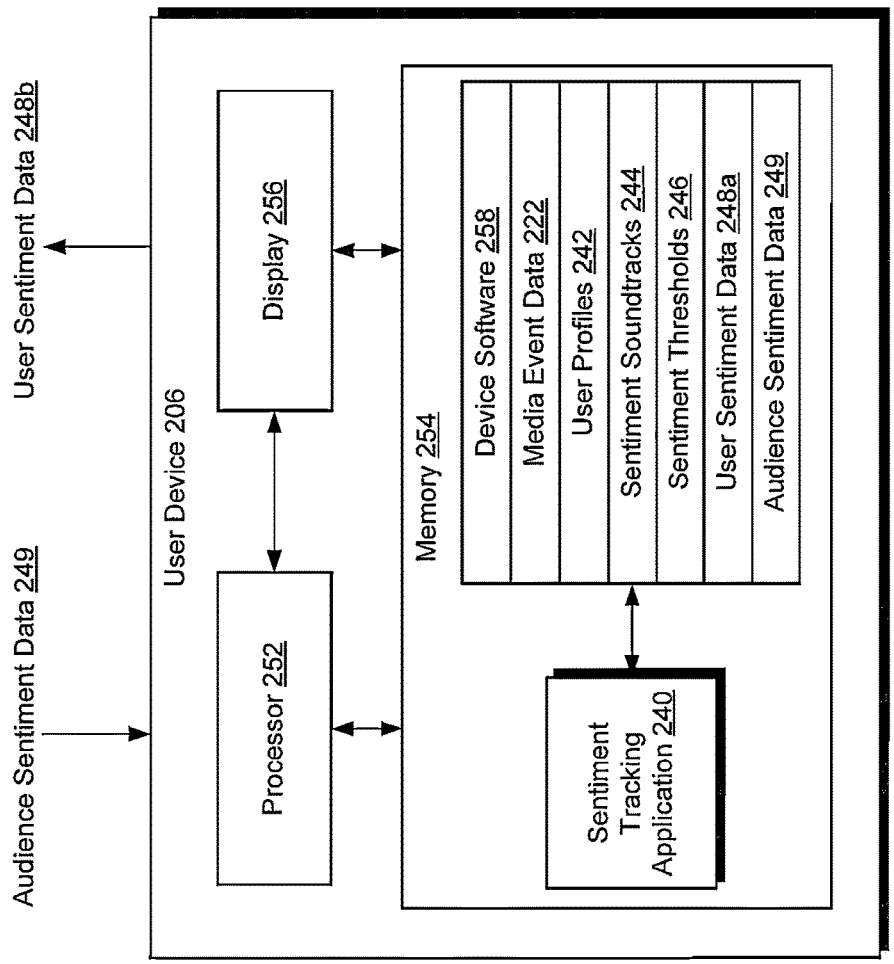
FIG. 2 provides a more detailed representation of a user device for use with an application for determining and responding to user sentiments during viewed media content.

Moving to FIG. 2, FIG. 2 provides a more detailed representation of a user device for use with an application for determining and responding to user sentiments during viewed media content. User device 250 of FIG. 2 is shown with processor 252, memory 254, and display 256. Memory 254 is shown storing sentiment tracking application 240, device software 258, media event data 222, user profiles 242, sentiment soundtracks 244, sentiment thresholds 246, user sentiment data 248a, and audience sentiment data 249. User device 250 is also shown transmitting user sentiment data 248b and receiving audience sentiment data 249.

User device 250 may be implemented as a user interactive device capable of receiving user input and displaying interactive applications and content. User device 250 may correspond to an interactive device capable of receiving user inputs directly, or through a peripheral device such as a remote. Thus, user device 250 may be implemented as a mobile phone, a personal computer (PC) or other home computer, a personal digital assistant (PDA), smart television, or a gaining console, for example.

User device 250 includes processor 252, memory 254, and display 256. Processor 252 of user device 250 is configured to access memory 254 to store received input and/or to execute commands, processes, or programs stored in memory 254. For example, processor 252 may receive data corresponding to a media event and/or user input/data and store the information in memory 254 as media event data 222, user profiles 242, and/or audience sentiment data 249. Processor 252 may also access memory 254 and execute programs, processes, and modules stored in memory 254, such as sentiment tracking application 240, sentiment soundtracks 244, sentiment thresholds 246, and/or device software 258. Additionally, processor 212 may store in memory 214 data resulting from executed programs, processes and modules, such as user sentiment data 248a. Processor 252 may correspond to a processing device, such as a microprocessor or similar hardware processing device, or a plurality of hardware devices. However, in other implementations, processor 252 refers to a general processor capable of performing the functions required by user device 250.

Memory 254 of user device 250 corresponds to a sufficient memory capable of storing commands, processes, and programs for execution by processor 252. Memory 254 may be instituted as ROM, RAM, flash memory, or any sufficient memory capable of storing a set of commands. In other implementations, memory 254 may correspond to a plurality memory types or modules. Thus, processor 252 and memory 254 contains sufficient memory and processing units necessary for user device 250. Although memory 254 is shown as located on user device 250, in other implementations, memory 254 may be separate but connectable to user device 250, such as an external hard drive, USB flash drive, or other connectable memory unit.

Display 256 is connected to processor 252 of user device 250 for rendering and output of a user interface for sentiment tracking application 240. Display 256 may correspond to a visual display unit capable of presenting and rendering media content for a user. Display 256 may correspond to a liquid crystal display, plasma display panel, cathode ray tube, or other display. Processor 252 is configured to access display 256 in order to render content for viewing by the user. While FIG. 2 shows display 256 as part of user device 250, in other implementations, display 256 may be external to user device 250 or separate and connectable to user device 250. Thus, in certain implementations, such as when user device 250 is a television receiver, display 256 may be separate and connectable to user device 250. Additionally, display 256 may correspond to one visual display unit or a plurality of visual display unit Memory 254 is shown with sentiment tracking application 240. Sentiment tracking application 240 may correspond to computer software, processes, and/or procedures for use during broadcast of a media event. Sentiment tracking application 240 may include processes and/or procedures for displaying a plurality of user selectable sentiment actions during playback of the media content. As will be explained in further detail below, the plurality of user selectable sentiment actions may be chosen by a plurality of users of sentiment tracking application 240 in response to comments, scenes, or other events during viewing of the media content. Thus, sentiment tracking application 240 may include processes and/or procedures for playback of the media content, for display and selection of the plurality of user selectable sentiment actions, and/or for transmitting and receiving data corresponding to the plurality of user selectable sentiment actions.

Memory 254 of user device 250 also contains device software 258, media event data 222, and user profiles 242. Device software 258 may include device applications, software, processes, and procedures for user with user device 250. For example, device software 258 may include media playback application, applications for finding, browsing, and/or downloading additional software, and/or image applications. In certain implementations, device software 258 may be usable with sentiment tracking application 240. For example, device software 258 may correspond to a media player for use with sentiment tracking application. In another implementation, device software 258 may include image software utilizing image and/or facial recognition processes. Thus, device software 258 may be utilized in order to provide facial recognition features as user sentiment inputs to sentiment tracking application 240.

Media event data 222 may correspond to data received from a media content provider. For example, in some implementations, a media content provider may transmit a media content corresponding to a media event to user device 250 for use with sentiment tracking application 240. However, in other implementations, the media content provider may provide other data to user device 250, such only the video, audio, or descriptive data corresponding to a media event for use with sentiment tracking application 240.

User profiles 242 may correspond to user information, such as a collection of identifying information corresponding to a specific user. For example, user profiles 242 may contain name, age, location, or other identifying information. User profiles 242 may further contain connected user profiles, such as friends profiles. User profiles 242 may be configurable by a user using user device 250 or may be separately set up and transmitted to user device 250.

Sentiment tracking application 240 may include additional features, such as of sentiment soundtracks 244 and sentiment thresholds 246. Sentiment soundtracks 244 may be utilized each time a user of user device 250 selects a sentiment action during viewing a media event. For example, sentiment soundtracks 244 may include a laugh, gasp, or boo soundtrack which plays if the user selects a laugh, shocked, or upset sentiment, respectively. However, in other implementations, sentiment tracking application 240 may utilize sentiment soundtracks 244 with sentiment thresholds 246. Sentiment thresholds 246 may correspond to threshold user percentages, numbers, or other determinative data for use with sentiment soundtracks 244. For example, if enough of a plurality of users, such as audience 102 of FIG. 1, select a specific sentiment of a plurality of sentiment actions, a threshold may be reached as determined by sentiment thresholds 246. In such an implementation, sentiment tracking application 240 may utilize sentiment soundtracks 244, as will be discussed in further detail with respect to FIG. 3. User device 250 may determine whether a threshold of sentiment thresholds 246 has been exceeded based on received data from audience sentiment data 249 and user sentiment data 248a, or may receive data from audience sentiment data 249 instructing user device to utilize sentiment soundtracks 244.

Memory 254 further contains user sentiment data 248a and audience sentiment data 249. User sentiment data 248a may correspond to sentiment data of a user of user device 250, such as selected sentiment actions on user device 250 during a media event. Thus, user sentiment data 248a may contain data correspond to an identity of a user selecting a specific sentiment action, the specific sentiment action selected, and other user sentiment data. For example, in the implementation where facial recognition is used to determine a user sentiment action, user sentiment data 248a may include a photograph or other image user to determine the user sentiment.

Audience sentiment data 249 corresponds to aggregated audience sentiment data corresponding to selected sentiment actions by a plurality of users of sentiment tracking application 240. Audience sentiment data 249 may include a total number of user selecting a specific sentiment actions during playback of a media content, demographics of users selecting sentiment actions during the media content, times of selected sentiment actions during a media content, or other data receiving from sentiment tracking application 240 during playback of a media content.

User device 250 may transmit sentiment data 248b. Sentiment data 248b may correspond to the some or a different iteration of sentiment data 248a. Sentiment data 248b may include tracked sentiment actions selected during broadcasting of a media event by a user of user device 250. User device 250 also receives audience sentiment data 249 and stores audience sentiment data 249 in memory 254. As previously discussed, audience sentiment data 249 may correspond to aggregated sentiment data corresponding to selected sentiment actions by an audience of a media event while using sentiment tracking application 240.

As previously discussed, a sentiment tracking server and database may transmit sentiment tracking application 240, for use with user device 250, to a media content provider for distribution during broadcast of a media event. In such an implementation, user device 250 may receive and transmit data corresponding to sentiment tracking application 240 to the sentiment tracking server and database, the media content provider, and/or a social networking service. However, in another implementation, the sentiment tracking server may transmit sentiment tracking application 240 prior to or during a media event for use while viewing the media event. In such an implementation, sentiment tracking application 240 may be a standalone application that may be transmitted to user device 250 and used during the media event.

User sentiment data 248b and/or audience sentiment data 249 may be further utilized by a sentiment tracking server and database, a media content provider of a media event, and/or a social networking service. For example, the sentiment tracking server and database may aggregate user sentiment data 248b and/or audience sentiment data 249. The aggregated data may be utilized to design advertisements, advertising campaigns, or other advertising opportunities around the aggregated data. The aggregated data may show the highest points of interest in a show to properly market those points to an audience.

In another implementation, user sentiment data 248b and/or audience sentiment data 249 may be utilized to adjust the media event depending on user sentiment data 248b and/or audience sentiment data 249. For example, a media content provider may include a live studio creating live media content. Thus, user sentiment data 248b and/or audience sentiment data 249 may be utilized to adjust the live media content during creation of the live media content. As previously discussed, the high points of interest in a show may be determined to adjust the live media event. Additionally, the live media event may receive user sentiment data 248b and/or audience sentiment data 249 informing the live media event of audience reactions to situations in the media event. When the media event corresponds to as prerecorded or time shifted media event, producers of the media event may also see sentiment data corresponding to audience's sentiment reactions to the media event. The producers can utilize the data to drive future programming decisions. Thus, a unique media viewing experience can be markets to the audience.

Additionally, user device 250 may transmit user sentiment data 248b and/or audience sentiment data 249 to a social networking service. In such an implementation, user device 250 may transmit user sentiment data 248b and/or audience sentiment data 249 in order to post status, send messages, or note approvals on the social networking service corresponding to user selected sentiment action.

Figure 3:
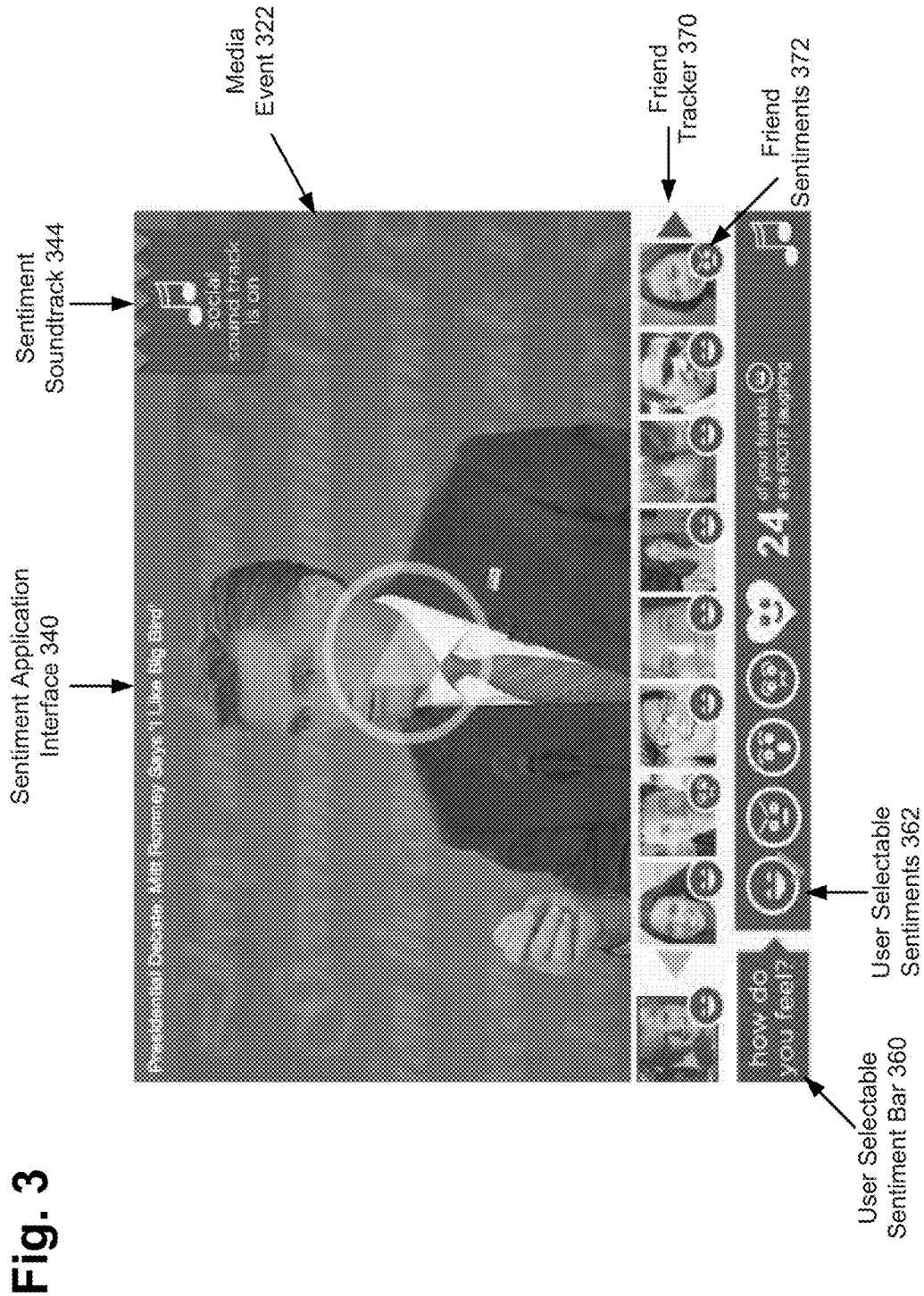
FIG. 3 presents an exemplary application interface for determining and responding to user sentiments during viewed media content.

Moving to FIG. 3, FIG. 3 presents an exemplary application interface for determining and responding to user sentiments during viewed media content. Sentiment application interface 340 is shown displaying media event 322 corresponding to a live media content. Additionally, shown in sentiment application interface 340 is user selectable sentiment bar 360 with user selectable sentiments 362. Application interface additionally shows friend tracker 370 with friend sentiments 372 and sentiment soundtrack 344.

As shown in FIG. 3, sentiment application interface 340 displays media content 322. As previously discussed, media event 322 may correspond to an audio, visual, and/or audiovisual media content consumable by a plurality of users. For example, in one implementation shown in FIG. 3, media event 322 corresponds to a live audiovisual broadcast of a national political debate. However, in other implementations, media event 322 may correspond to network television programming, movies, user generated content, interactive games and/or other media content.

As each of a plurality of users consume media event 322, sentiment application interface 340 presents user selectable sentiment bar 360. User selectable sentiment bar 360 may correspond to an interactive feature, such as a software toolbar, of an application corresponding to sentiment application interface 340. User selectable sentiment bar 360 may present interactive options to the user, such as user selectable sentiment 362, friend tracker 370, friend sentiments 372, and/or sentiment soundtrack 344. Thus, user selectable sentiment bar 360 is shown presenting selectable options to a plurality of users while they consume media event 322.

As shown in FIG. 3, user selectable sentiment bar 360 contains user selectable sentiments 362 which contain sentiments such as a smiling and/or happy sentiment, an angry and/or disagreeable sentiment, a surprised and/or shocked sentiment, a sad and/or concerned sentiment, and a loving sentiment. However, user selectable sentiment bar 360 may contain further and/or different sounds and emotions. During playback of media event 322, each of a plurality of users may select at least one of user selectable sentiments 362 depending on their current mood, reaction, or feeling during and/or in response to media event 322. Thus, in one example, if a user is shocked by the content of a media event 322, the user may select a shocked sentiment from user selectable sentiments 362.

Although in the implementation of FIG. 3, user selectable sentiments 362 is shown as a selectable icon bar having selectable icons, in other implementations, other user input may be used to select user selectable sentiments 362. Device cameras and image recognition applications may be utilized to determine whether a user is happy, sad, angry, or has a different emotional response during media event 322. For example, a user viewing media event 322 may laugh at a certain time during media event 322. Sentiment application interface 340 may register this laugh to provide real time data on the users current sentiment, as well as provide a laugh track, or other users laughs, while during the users emotional response to media event 322. Thus, facial mapping processes allow users to express their sentiment to media event 322 more intuitively. Additional data from image recognition applications may be utilized with sentiment application interface 340, such as posting a facial image of a user in response to the users sentiment action in sentiment application interface 340 or transmitting to an external source, such as a social networking service.

After selection of one of user selectable sentiments 362, sentiment application interface 340 may transmit data corresponding to the selection to a sentiment tracking server and database. Thus, the selection from user selectable sentiments 362 may be utilized to provide sentiment data corresponding to media event 322.

Additionally, sentiment application interface 340 may present friend tracked 370 having friend sentiments 372. Friend tracker 370 may correspond to a displayable bar with interactive icons presented to linked users while viewing media event 322 through sentiment application interface 340. For example, a user may log into an application to view sentiment application interface 340 and provide user profile details for a corresponding user account. The user account may be linked to other user accounts that may also view media event 322 during playback. Thus, friend tracker 370 may present the linked users in sentiment application interface 340 during playback of media event 322. Additionally, as the other users select sentiments during playback of media event 322, the selections may be presented to the user of sentiment application interface 340 as friend sentiments 372.

Sentiment application interface 340 is also shown with sentiment soundtrack 344. Sentiment soundtrack 344 may correspond to a sentiment soundtrack depending on user selectable sentiments 362. For example, if a single user selects a specific sentiment from user selectable sentiments 362, the user may hear a responsive audio from sentiment application interface 340 in the form of sentiment soundtrack 344. However, in other implementations, a specific threshold percentage of a plurality of users must select a specific sentiment from user selectable sentiments 362 before a response is transmitted through sentiment soundtrack 344. Thus, in such an implementation, a specific percentage, such as 30% of the audience members must select one of user selectable sentiments 362, before a specific response may occur through sentiment soundtracks 344. However, in other implementations, an application and/or server support sentiment application interface 340 may support multiple selections of sentiments from user selectable sentiments 362 for playback. Thus, if a specific threshold is reached of 2-3 sentiments, for example 30% of users select a sad, happy, and surprised sentiment, a response corresponding to the multiple exceeded thresholds may occur through sentiment soundtracks 344.

FIGS. 1, 2, and 3 will now be further described by reference to FIG. 4, which presents flowchart 400 illustrating a method for use by an application for determining and responding to user sentiment during viewed media content. With respect to the method outlined in FIG. 4, it is noted that certain details and features have been left out of flowchart 400 in order not to obscure the discussion of the inventive features in the present application.

Figure 4:
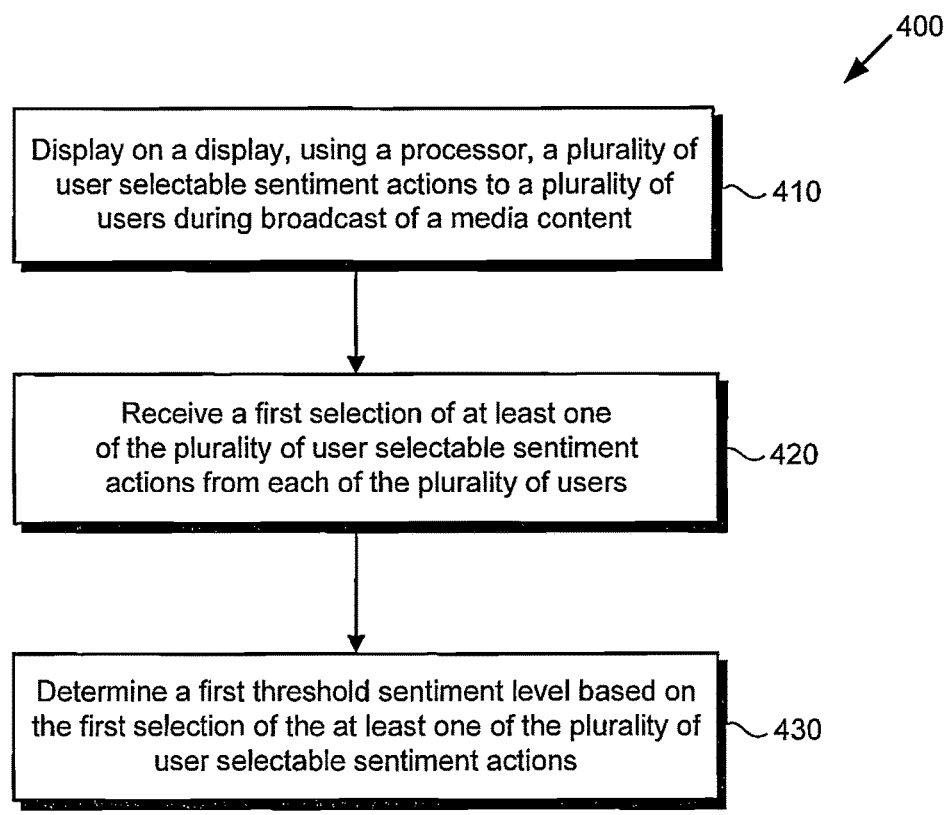
FIG. 4 presents an exemplary flowchart illustrating a method for use by an application for determining and responding to user sentiment during viewed media content.

Referring to FIG. 4 in combination with FIG. 1, FIG. 2, and FIG. 3, flowchart 400 begins with displaying on a display 256, using a processor 212, a plurality of user selectable sentiment actions 362 to a plurality of users 102 during broadcast of a media content 122/322 (410). The displaying may be performed by processor 212 of user device 250 while media event 122/322 is viewed by audience 102. Sentiment application interface 340 may display user selectable sentiment actions 364 in user selectable sentiment bar 360. As previously discussed, sentiment tracking application 140/240 may display media event 122/322 concurrently as shown in sentiment application interface 340, or sentiment tracking application 140/240 may be used as a standalone application while audience 102 separately views a broadcast of media event 122/322.

The method of flowchart 400 continues with receiving a first selection of at least one of the plurality of user selectable sentiment actions 362 from each of a plurality of users 102 (420). The receiving may be performed by processor 212 of user device 250. The receiving may be performed after each of a plurality of users, such as each user from audience 102, selects a specific action from user selectable sentiments 362. The selected sentiment may correspond to a user feeling, emotion, or response to media event 122/322 during viewing of media event 122/322.

Flowchart 400 concludes with determining a first threshold sentiment 256 level based on the first selection of the at least one of the plurality of user selectable sentiment actions 362 (430). The determining may be performed by processor 212 of user device 250 after receiving a selection of one of user selectable sentiments 362. The determining may also correspond to receiving audience sentiment data 249 from sentiment tracking server and database 110 determining whether one of sentiment thresholds 246 has been met.

Thus, it is possible to tally, record, and aggregate user sentiments while users view, listen, or otherwise consume a media content. From the above implementations, manufacturers of media content can further tailor advertisement and live media content to users desires. Thus, determining user sentiments during viewed media content provides a power analytical tool.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for use by a system including a processor and a display, the method comprising:
   displaying on the display, using the processor, a plurality of user selectable sentiment actions to a plurality of users during broadcast of a media content;
   receiving a first selection of a first user selectable sentiment action of the plurality of user selectable sentiment actions from a first group of the plurality of users;
   receiving a second selection of a second user selectable sentiment action of the plurality of user selectable sentiment actions from a second group of the plurality of users, wherein the first user selectable sentiment action is different from the second user selectable sentiment action;
   determining whether a first threshold sentiment level is reached, wherein the first threshold sentiment level corresponds to a first number of the first group of the plurality of users making the first selection of the first user selectable sentiment action of the plurality of user selectable sentiment actions, and wherein the first number of the first group of the plurality of users corresponds to a first percentage of the plurality of users;
   determining whether a second threshold sentiment level is reached, wherein the second threshold sentiment level corresponds to a second number of the second group of the plurality of users making the second selection of the second user selectable sentiment action of the plurality of user selectable sentiment actions, and wherein the second number of the second group of the plurality of users corresponds to a second percentage of the plurality of users;
   triggering a response corresponding to reaching the first threshold level and the second threshold level, the response including playing multiple sentiment sound tracks having a first sentiment soundtrack corresponding to the first threshold sentiment level in combination with a second sentiment soundtrack corresponding to the second threshold sentiment level, wherein the first sentiment soundtrack is different from the second sentiment soundtrack.

2. The method of claim 1 further comprising:
   displaying the media content, wherein the plurality of user selectable sentiment actions correspond to a toolbar below the media content containing a plurality of user selectable icons including a smiling icon, a frowning icon, a sad icon, a surprised icon, and a laughing icon corresponding to the plurality of user selectable sentiment actions.

3. The method of claim 1, further comprising:
   sharing the first selection of the first user selectable sentiment action and the second selection of the second user selectable sentiment action of the plurality of user selectable sentiment actions from each of the first group and the second group of the plurality of users using a social networking platform, respectively.

4. The method of claim 1 further comprising:
   transmitting information corresponding to the first number of the first group of the plurality of users making the first selection and the second number of the second group of the plurality of users making the second selection to a broadcast media studio corresponding to the media content.

5. The method of claim 4 further comprising:
   adjusting a feature of the media content based on the first number of the first group of the plurality of users making the first selection and the second number of the second group of the plurality of users making the second selection.

6. The method of claim 1 further comprising:
   displaying a user list containing names for each of the plurality of users.

7. The method of claim 1, wherein the displaying on the display corresponds to a mobile device application.

8. The method of claim 1 wherein the triggering the first sentiment soundtrack corresponding to the first threshold sentiment level and the second soundtrack corresponding to the second threshold sentiment level is performed automatically.

9. A system comprising:
   a processor; and
   a display;
   wherein the processor is configured to:
      display on the display a plurality of user selectable sentiment actions to a plurality of users during broadcast of a media content;
      receive a first selection of a first user selectable sentiment action of the plurality of user selectable sentiment actions from a first group of the plurality of users;
      receive a second selection of a second user selectable sentiment action of the plurality of user selectable sentiment actions from a second group of the plurality of users, wherein the first user selectable sentiment action is different from the second user selectable sentiment action;
      determine whether a first threshold sentiment level is reached, wherein the first threshold sentiment level corresponds to a first number of the first group of the plurality of users making the first selection of the first user selectable sentiment action of the plurality of user selectable sentiment actions, and wherein the first number of the first group of the plurality of users corresponds to a first percentage of the plurality of users;

determine whether a second threshold sentiment level is reached, wherein the second threshold sentiment level corresponds to a second number of the second group of the plurality of users making the second selection of the second user selectable sentiment action of the plurality of user selectable sentiment actions, and wherein the second number of the second group of the plurality of users corresponds to a second percentage of the plurality of users;

triggering a response corresponding to reaching the first threshold level and the second threshold level, the response including playing multiple sentiment sound tracks having a first sentiment soundtrack corresponding to the first threshold sentiment level in combination with a second sentiment soundtrack corresponding to the second threshold sentiment level, wherein the first sentiment soundtrack is different from the second sentiment soundtrack.

10. The system of claim 9, wherein the processor is further configured to:

display the media content;

and wherein the plurality of user selectable sentiment actions correspond to a toolbar below the media content containing a plurality of user selectable icons including a smiling icon, a frowning icon, a sad icon, a surprised icon, and a laughing icon corresponding to the plurality of user selectable sentiment actions.

11. The system of claim 9, wherein the processor is further configured to:

share the first selection of the first user selectable sentiment action and the second selection of the second user selectable sentiment action of the plurality of user selectable sentiment actions from each of the first group and the second group of the plurality of users using a social networking platform, respectively.

12. The system of claim 9, wherein the processor is further configured to:

transmit information corresponding to the first number of the first group of the plurality of users making the first selection and the second number of the second group of the plurality of users making the second selection to a broadcast media studio corresponding to the media content.

13. The system of claim 12, wherein the processor is further configured to:

adjust a feature of the media content based on the first number of the first group of the plurality of users making the first selection and the second number of the second group of the plurality of users making the second selection.

14. The system of claim 9, wherein the processor is further configured to:

display a user list containing names for each of the first group and the second group of the plurality of users.

15. The system of claim 9, wherein the processor is further configured to:

display on the display using a mobile device application.

16. The system of claim 9, the triggering the first sentiment soundtrack corresponding to the first threshold sentiment level and the second soundtrack corresponding to the second threshold sentiment level is performed automatically.

* * * * *